United States Patent
Sowul et al.

(10) Patent No.: US 7,036,645 B2
(45) Date of Patent: May 2, 2006

(54) ROTATING TORQUE-TRANSMITTING APPARATUS

(75) Inventors: Henryk Sowul, Novi, MI (US); Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 22 days.

(21) Appl. No.: 10/872,228

(22) Filed: Jun. 18, 2004

(65) Prior Publication Data
US 2005/0279605 A1 Dec. 22, 2005

(51) Int. Cl.
*F16D 21/02* (2006.01)
(52) U.S. Cl. ............................. 192/48.91; 192/85 CA
(58) Field of Classification Search ............. 192/48.8, 192/48.91, 85 CA
See application file for complete search history.

(56) References Cited
U.S. PATENT DOCUMENTS

| | | | | | |
|---|---|---|---|---|---|
| 3,011,608 | A | * | 12/1961 | Hansen | 192/85 CA |
| 3,157,257 | A | * | 11/1964 | Root | 192/18 A |
| 3,429,410 | A | * | 2/1969 | Hansen | 192/85 CA |
| 3,613,849 | A | * | 10/1971 | Pape | 192/90 |
| 3,684,069 | A | * | 8/1972 | Pray | 192/85 CA |
| 3,706,365 | A | * | 12/1972 | Bohm et al. | 192/85 CA |
| 3,805,933 | A | * | 4/1974 | Pray | 192/85 CA |
| 5,234,090 | A | * | 8/1993 | Haka | 192/70.25 |
| 5,887,690 | A | * | 3/1999 | Haupt | 192/87.11 |
| 5,931,275 | A | * | 8/1999 | Kasuya et al. | 195/85 CA |
| 6,374,976 | B1 | * | 4/2002 | Alberni et al. | 192/85 CA |
| 6,382,382 | B1 | * | 5/2002 | Avny et al. | 192/106 F |
| 6,454,068 | B1 | * | 9/2002 | Arai et al. | 192/35 |

* cited by examiner

*Primary Examiner*—Saul Rodriguez
(74) *Attorney, Agent, or Firm*—Christopher DeVries

(57) ABSTRACT

A rotatable torque-transmitting apparatus includes a stationary piston and a rotatable apply plate. The rotatable apply plate is disposed adjacent a rotatable housing and separated therefrom by a return spring assembly which in a preload condition is trapped between the apply plate and the rotatable housing to limit the disengaged force which is transmitted between the rotatable housing and the stationary piston.

7 Claims, 2 Drawing Sheets

ROTATING TORQUE-TRANSMITTING APPARATUS

TECHNICAL FIELD

This invention relates to rotating torque-transmitting apparatus and, more particularly, to rotating torque-transmitting apparatus having a stationary apply piston.

BACKGROUND OF THE INVENTION

Automatic power transmissions having planetary gearsets employ a plurality of torque-transmitting mechanisms. The torque-transmitting mechanisms take the form of stationary type and rotating type. Stationary type torque-transmitting mechanisms are commonly termed brakes, and rotating type torque-transmitting mechanisms are commonly termed clutches.

The stationary type torque-transmitting mechanism has at least one portion of that mechanism; namely, a plurality of disc members, drivingly connected through a spline with a stationary housing. Therefore, a stationary piston can be placed in that housing such that rotating drag forces cannot affect the piston. It is also simpler to direct hydraulic fluid through a stationary housing to a stationary piston.

Rotating type torque-transmitting mechanisms, on the other hand, often employ a rotating clutch piston. The entire input portion of the clutch, namely, piston apply plates and friction discs, is assembled in a rotatable housing. The apply piston cooperates with the housing to form an apply chamber. Hydraulic fluid is supplied to the apply chamber through a rotating joint or connection which requires seal members. The seal members provide a leakage path for a portion of the oil, which is not desirable. Also, with the rotating housing the apply chamber requires a ball dump or centrifugal escape mechanism or a centrifugal dam portion which will counteract the centrifugal forces applied hydraulically to the apply piston when the clutch is disengaged.

More recently, it has been proposed to employ a stationary housing and stationary piston in a rotating type torque-transmitting mechanism. This requires a bearing member to be disposed between the piston and a rotating apply plate. The bearing member absorbs the relative rotation between the apply plate and the apply piston when the clutch is engaged and disengaged. With a stationary piston, the return spring for the apply plate and piston is faced either between the apply plate and a rotating housing of the clutch or between a stationary portion of the housing and the stationary piston. When the return spring is disposed between the stationary piston and the stationary portion of the housing, the apply plate is free and can generate noise within the system. Generally, when the return spring is placed between the rotating housing and the apply plate, a significant bearing load is imposed upon the bearing between the piston and apply plate when the clutch is disengaged as well as when the clutch is engaged. While the bearing load during disengagement is less than the load during clutch engagement, this load is still significant and contributes to the drag losses of the transmission, thereby reducing the overall economy of the vehicle drivetrain.

SUMMARY OF THE INVENTION

It is an object of the present invention to provide an improved rotating torque-transmitting mechanism having a stationary piston.

In one aspect of the present invention, the torque-transmitting mechanism includes an apply piston, an apply plate, a bearing rotatably supported between the apply piston and apply plate, and a return spring urging the apply plate toward the piston during disengagement of the torque-transmitting mechanism.

In another aspect of the present invention, the apply plate has a plurality of apply fingers extending axially to engage a pressure plate within the rotating housing which is a component of the torque-transmitting mechanism.

In yet another aspect of the present invention, the return spring is disposed between the apply plate and the rotating housing of the torque-transmitting mechanism.

In a further aspect of the present invention, the apply plate has a stop or motion-limiting member secured thereto which limits the relative motion between the apply plate and the rotating housing.

In a yet further aspect of the present invention, the motion-limiting member cooperates with the rotating housing to enclose the return spring assembled force between the apply plate and the rotating housing, thereby reducing the load on the bearing disposed between the apply plate and the apply piston.

In a still further aspect of the present invention, the apply plate is comprised of a substantially annular member and a substantially tubular member which are assembled together through a mechanical joint.

In a yet still further aspect of the present invention, the tubular member of the apply plate has the motion-limiting member assembled thereto and includes a plurality of axially-extending fingers which pass through at least one torque-transmitting mechanism to an engagement position adjacent an axially-displaced torque-transmitting mechanism.

DESCRIPTION OF EXEMPLARY EMBODIMENTS

Figure 1:
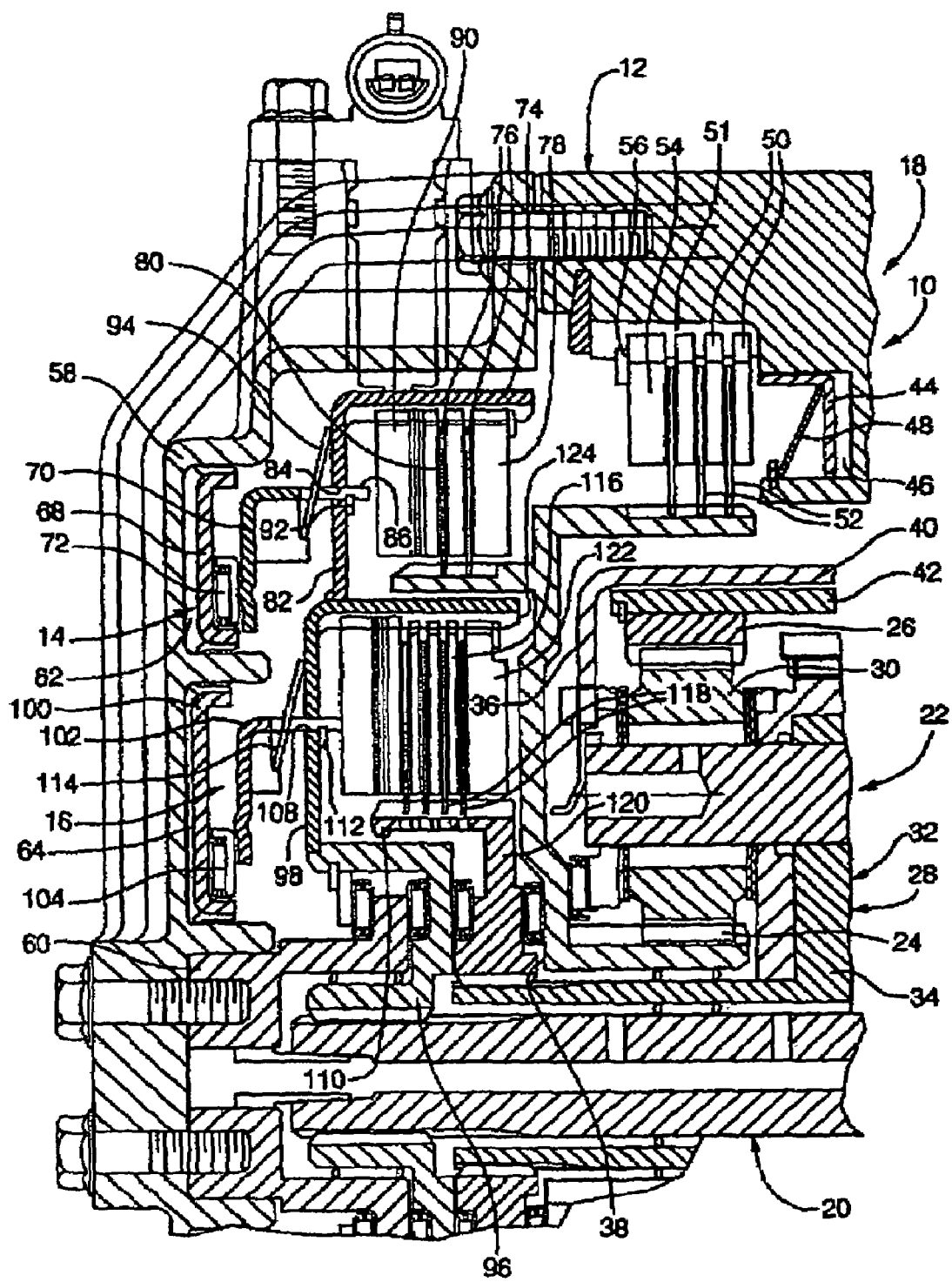
FIG. 1 is cross-sectional elevational view of a portion of a transmission having a plurality of torque-transmitting mechanisms incorporating the present invention.

FIG. 1 depicts a portion 10 of a transmission including a transmission housing 12, a first torque-transmitting mechanism 14, a second torque-transmitting mechanism 16, a third torque-transmitting mechanism 18, an input shaft 20, and a planetary gearset 22.

The planetary gearset 22 includes a sun gear member 24, a ring gear member 26, and a planet carrier assembly member 28. The planet carrier assembly member 28 includes a plurality of pinion gears 30 rotatably mounted on a planet carrier member 32 and disposed in meshing relationship with both the sun gear member 24 and the ring gear member 26. The planet carrier member 32 includes a pair of side plates 34 and 36. The sun gear member 24 is connected with a hub portion 38. The planet carrier member side plate 36 is secured to a hub or drum member 40 and the ring gear member 26 is secured to a hub member 42.

The torque-transmitting mechanism 18 includes an apply piston 44, which is slidably disposed in an apply chamber or cavity 46. The piston 44 is urged toward the right to a disengaged condition by a return spring 48, which is a Belleville-type spring. The torque-transmitting mechanism 18 also includes a plurality of friction plates or discs 50, which are drivingly connected with a spline formed in a hub 51 that is secured in the housing 12 and a pair of alternately-spaced friction plates or discs 52, which are splined to the hub 38. A backing plate 54 is located on the spline in the housing 12 by a locking ring 56, which limits the leftward motion of the discs 50 and 52 when the torque-transmitting mechanism 18 is applied. The torque-transmitting mechanism 18 is of the stationary type, commonly termed a brake.

The transmission housing 12 has installed therein a secondary housing 58 and a bearing support member 60. The secondary housing 58 has a pair of cavities or chambers 62 and 64 formed therein.

The torque-transmitting mechanism 14 is a rotating type torque-transmitting mechanism, commonly termed a clutch. The torque-transmitting mechanism 14 includes a slidable apply piston member 68, which is slidably disposed in the chamber 62 and cooperates therewith to form an apply chamber for the torque-transmitting mechanism 14. The torque-transmitting mechanism 14 also includes an apply plate 70, which is rotatably supported from the apply piston 68 by a thrust bearing 72. The torque-transmitting mechanism 14 further includes a housing 74 in which is drivingly connected through a spline a plurality of friction plates or discs 76 and a backing plate 78. The plates 76 and backing plate 78 are alternately spaced with a plurality of friction plates or discs 80, which are connected through a spline with the hub 38.

The housing 74 has a radial wall 82 in which is formed a plurality of openings or windows 84. The apply plate 70 includes a plurality of axial extensions or fingers 86 which extend through the windows 84 and are aligned for abutment with a pressure plate 90, which is splined to the housing 74. A locking ring or locating ring 92 is secured in the fingers 86 of the apply plate 70 and arranged to abut the inner surface of the radial wall 82 to limit leftward movement of the apply plate 70 in a direction to disengage the torque-transmitting mechanism 14.

A return spring 94 is compressed between the apply plate 70 and the radial wall 82 to urge the apply plate 70 leftward to a disengaged position as shown in FIG. 1. The return spring 94 is a Belleville-type spring. The locating ring 92 limits the leftward movement and therefore absorbs or reacts to the preload force on the spring 94. The apply plate 70 abuts the thrust bearing 72 with a minimum of force and therefore reduces the drive forces which occur within the transmission system when the torque-transmitting mechanism 14 is in the disengaged position. To engage the torque-transmitting mechanism 14, the chamber 62 is pressurized by control fluid in a well-known manner to urge the piston 68 and therefore apply plate 70 rightward so that the apply plate abuts the pressure plate 90, thereby enforcing frictional engagement between the plates 78 and 80 such that a frictional drive connection is established between the housing 74 and the hub 38, and therefore sun gear member 24.

The input shaft 20 is drivingly connected through a hub 96 to a housing 98, which is secured to the housing 74. Therefore, the housing 74 rotates with the input shaft 20. The housing 98 is a component of the torque-transmitting mechanism 16.

The torque-transmitting mechanism 16 is a rotating type torque-transmitting mechanism, commonly termed a clutch, which includes therein a stationary apply piston 100 slidably disposed in the chamber 64 and an apply plate 102, which is rotatably supported in the stationary piston 100 through a thrust bearing 104. The apply plate 102 has a plurality of axially-extending fingers 106, which extend through windows 108 formed in the housing 98 into close proximity with a pressure plate 110 when the torque-transmitting mechanism 16 is in the disengaged position. A locating ring or locking ring 112 is secured in the axially-extending fingers 106 in a position to abut an inner surface of the housing 98, thereby limiting the leftward motion of the apply plate 102. The apply plate 102 is urged toward the left by a Belleville-type return spring 114, which is preloaded between the apply plate 102 and the housing 98. The preload force or the disengaged force on the apply plate 102 is absorbed primarily by the locating ring 112.

The torque-transmitting mechanism 16 has a plurality of friction discs or plates 116 secured or drivingly connected with a spline formed in the housing 98 and a plurality of friction plates or discs 118 drivingly connected to a splined hub 120, which is drivingly connected with the plate 34 of the planet carrier assembly member 28. Also splined to the housing 98 are a backing plate 122 and the pressure plate 110. The backing plate 122 is limited in rightward movement by a locating or locking ring 124. The backing plate 122 limits the rightward motion of the plates 116 and 118 during engagement of the torque-transmitting mechanism 16.

The torque-transmitting mechanisms 14 and 16 are engaged by fluid pressure admitted to the chambers 62 and 64, respectively. During engagement, a significant amount of force is transmitted from the respective pistons 68 and 100. This force is transmitted through the respective bearings 72 and 104 to the respective apply plates 70 and 102. During the engagement of either or both of these torque-transmitting mechanisms 14 and 16, the bearings 72 and 104 readily absorb the torque forces and are designed to do so. However, during disengagement, it is preferable that the forces on the bearings 104 and 72 are minimum; therefore, the leftward motion of the apply plates 70 and 102 is limited by their respective locating rings 92 and 112. As was previously explained, the preload on the springs 94 and 114 are reacted by the locating rings 92 and 112, respectively.

During disengagement of either or both of the torque-transmitting mechanisms 14 and 16, the chambers 62 and 64 will remain filled with low-pressure fluid, which will continue to urge the pistons 68 and 100 rightward. This slight or low pressure will provide sufficient force to maintain the respective bearings 72 and 104 in contact between the apply pistons 68 and 100, and their respective apply plates 70 and 102. However, as previously explained, the larger force, which is the preload force on the respective springs, is not absorbed by the bearings 72 and 104. The pistons 68 and 100 remain stationary both during the engaged and disengaged conditions of the torque-transmitting mechanisms 14 and 16.

The hubs 40 and 42 permit the planet carrier assembly member 28 and the ring gear member 26 to be connected to other transmission elements, not shown, such as gear members or other torque-transmitting devices.

Figure 2:
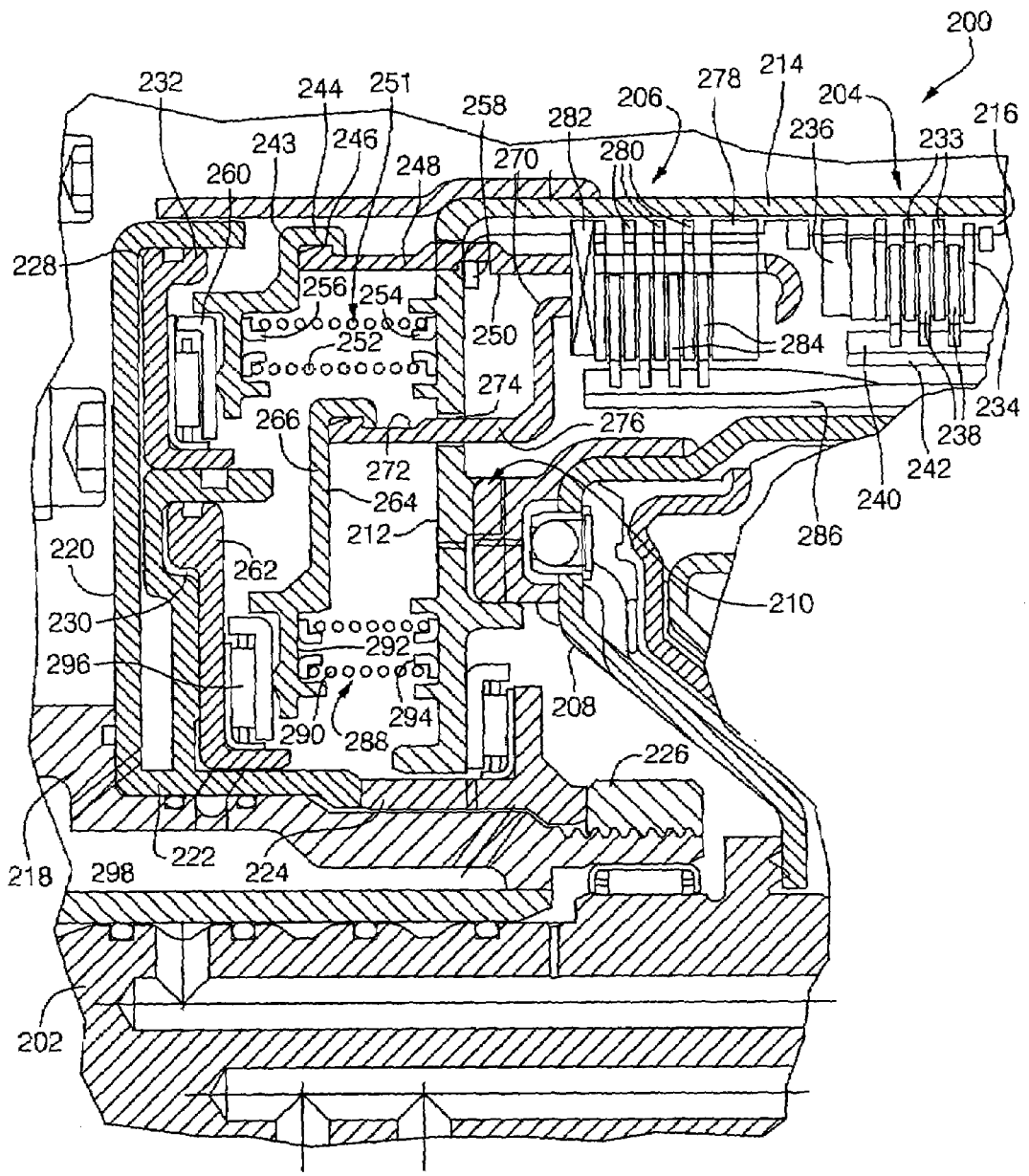
FIG. 2 is a cross-sectional elevational view of a portion of a transmission having a plurality of torque-transmitting mechanisms incorporating another embodiment of the present invention.

A portion of a transmission 200 is found in FIG. 2. The transmission 200 includes an input shaft 202, a first torque-transmitting mechanism 204, and a second torque-transmitting mechanism 206. Both of the torque-transmitting mechanisms 204 and 206 are of the rotating type torque-transmitting mechanisms, commonly termed clutches. The input shaft 202 is drivingly connected through a hub 208 and an axial spline connection 210 to a housing member 212. The housing member 212 rotates in unison with the input shaft 202.

The housing 212 includes an axially-extending drum portion 214 in which is formed a spline portion 216. The input shaft 202 is rotatably supported in a stationary transmission housing 218. A radially extending housing 220 is supported in the stationary transmission housing 218, as is a housing 222. These two housing 220 and 222 are positioned axially in the housing 218 by a hub 224, which is secured in the housing 218 by a threaded fastener 226. The housings 220 and 222 and the piston 232 cooperate to form an apply chamber 228 and the housing 222 has formed therein an apply chamber 230.

The torque-transmitting mechanism 204 includes an apply piston 232, which is slidably disposed in the apply chamber 228. The torque-transmitting mechanism 204 also includes a plurality of friction plates or discs 233, a reaction or backing plate 234, and a pressure plate 236, all of which are drivingly connected with the spline 216. A plurality of plates or discs 238 are alternately spaced with the plates 233 and are drivingly connected with a spline 240 formed on a housing or hub 242. The torque-transmitting mechanism 204 further includes an apply plate assembly 243, which includes a first member 244, which is mechanically connected through a swedge joint 246 with a hub and finger extension member 248. The hub and finger extension member 248 has a plurality of fingers 250, which pass through the housing 212 and extend axially into abutting relationship with the pressure plate 236 when the torque-transmitting mechanism 204 is engaged.

The apply plate assembly 243 is urged leftward to a disengaged position by a return spring assembly 251, which is comprised of a plurality of coil springs 252 secured to a pair of retainer plates 254 and 256. The return spring assembly 251 urges separation between the housing 212 and the apply plate assembly 243 to place the torque-transmitting mechanism 204 in a disengaged condition. A locking or locating ring 258 is secured in the fingers 250 in a position to abut the right-hand surface of the housing 212, thereby limiting the leftward movement of the apply plate assembly 243. Thus, the preload force of the return spring assembly 251 is maintained between the apply plate assembly 243 and the housing 212, both of which rotate in unison with the input shaft 202.

The apply piston 232 is stationary with the housing 220. To permit relative rotation between the apply piston 232 and the apply plate assembly 243, a thrust bearing 260 is installed between the piston 232 and the apply plate assembly 243. During disengagement of the torque-transmitting mechanism 204, the thrust bearing 260 absorbs the force of the exhaust fluid pressure, which is very low, in the chamber 228, which urges the piston 232 rightward with minimum force. The force on the piston 232 during disengagement is kept at a minimum value with oil pressure sufficient to maintain the cavity or chamber 228 filled with low-pressure oil. During engagement of the torque-transmitting mechanism 204, the full engagement force between the piston 232 and the apply plate 243 is transmitted through the bearing 260. However, it is desirable to maintain the force on the bearing 260 at a minimum value during disengagement, thereby reducing the drag forces within the transmission system.

The torque-transmitting mechanism 206 is also a rotating type torque-transmitting mechanism or clutch. The torque-transmitting mechanism 206 includes an apply piston 262, which is slidably disposed in the chamber 230. An apply plate assembly 264 includes an annular hub 266 and a drum 270. The drum 270 has a plurality of fingers or extensions 272, which pass through windows or openings 274 formed in the housing 212. The drum 270 has a solid annular portion 276 from which the fingers 272 extend. The annular portion of the drum 270 between the fingers 272 abuts the right-hand surface of the housing 212, thereby limiting the leftward movement of the drum 270 and therefore apply plate assembly 264.

The torque-transmitting mechanism 206 includes a backing plate 278, a plurality of friction plates or discs 280, and a pressure plate 282, all of which are drivingly connected with the spline 216. The pressure plate 282 is abutted by the drum 270 of the apply plate assembly 264 during engagement of the torque-transmitting mechanism 206. The torque-transmitting mechanism 206 also includes a plurality of plates or discs 284, which are alternately spaced with the plates 280 and splined through a hub 286. The hubs 242 and 286 are connected to other transmission components, not shown.

The apply plate assembly 264 is urged leftward away from the housing 212 by a return spring assembly 288. The return spring assembly 288 includes a plurality of coil springs 290, which are assembled through a pair of annular retainer plates 292 and 294. The return spring assembly 288 urges separation between the apply plate assembly 264 and the housing 212 when the torque-transmitting mechanism 206 is disengaged. The drum 270 limits the separation between these two members and therefore the preload force of the return spring assembly 288 is absorbed by the apply plate assembly 264 and the housing 212. The piston 262 is separated from the apply plate assembly 264 by a thrust bearing 296.

During engagement of the torque-transmitting mechanism 206, the thrust bearing 296 absorbs the full engagement force transmitted from the piston 262 to the apply plate assembly 264. However, during disengagement of the torque-transmitting mechanism 206, a minimum force is transmitted between the piston 262 and the apply plate assembly 264. This minimum force is created by the exhaust or disengagement pressure found in the chamber 230 when the torque-transmitting mechanism 206 is disengaged.

As with the embodiment shown in FIG. 1, the apply plates of the FIG. 2 embodiment are substantially held in proper alignment for engagement of their torque-transmitting mechanisms by the preload force of the return springs that are trapped between the respective apply plates and the rotating housings. As well as maintaining the proper alignment, this structure also reduces the noise generated within the transmission since the structures are not free to vibrate relative to each other, when in the disengaged position by the preload force of the respective return springs.

The invention claimed is:

1. A rotating torque-transmitting apparatus comprising:
   a first rotatable transmission housing;
   a second rotatable transmission housing;
   a third rotatable transmission housing;
   a stationary transmission housing;
   first and second apply pistons slidably disposed in said stationary transmission housing;
   first and second torque-transmitting plate members drivingly connected with said first and second rotatable transmission housings respectively;
   third and fourth torque-transmitting plate members drivingly connected with said first and third rotatable transmission housings respectively
   first and second apply members;
   rotatable bearing means disposed between each said apply members and said apply pistons;

return spring means disposed between each of said rotatable transmission housings and said apply members for urging said apply members axially in one direction relative to said first rotatable transmission housing;

means secured to at least one of said apply members for limiting movement of said apply member in said one direction; and means for urging axial movement of said apply pistons and said apply members in an opposite direction to enforce frictional engagement between said first and second torque-transmitting plate members and said third and fourth torque-transmitting plate members wherein said pistons remains non-rotatable within said stationary housing.

2. The rotating torque-transmitting apparatus defined in claim 1 further comprising:

said means for limiting movement including a locking ring secured to said apply member and disposed for abutment with one of said first and second rotatable transmission housings when said apply member is urged in said one direction.

3. The rotating torque-transmitting apparatus defined in claim 1 further comprising:

said means for limiting movement including surfaces on said apply member that are disposed for abutment with one of said first and second rotatable transmission housings.

4. The rotating torque-transmitting apparatus defined in claim 3 further comprising:

said apply member comprising an annular hub and a drum, said means for limiting movement being formed on said drum.

5. A rotating torque transmitting apparatus comprising:

a first rotatable transmission housing, a second rotating transmission housing, a stationary transmission housing, an apply piston slidably and non-rotatably disposed in said stationary transmission housing, first and second torque-transmitting plate members drivingly connected with said first and second rotatable transmission housings respectively, an apply member, a rotatable bearing means disposed between said apply member and said apply piston, a return spring means disposed between one of said rotatable transmission housings in said apply member for urging said apply member axially in one direction relative to said one rotatable transmission housing, means secured to said apply member for limiting movement of said apply member in said one direction, and means for urging axial movement of said apply piston and said apply member in an opposite direction to enforce frictional engagement between said first and second torque-transmitting plate members wherein said piston remains non-rotatable within said stationary housing; and a second rotatable torque transmitting mechanism comprising;

a third rotatable transmission housing, a second apply piston slidably and non-rotatably disposed in said stationary transmission housing, third and fourth torque-transmitting plate members drivingly connected with said first and third rotatable transmission housings respectively, a second apply member, a rotatable bearing means disposed between said second apply member and said second apply piston, a return spring means disposed between one of said rotatable transmission housings in said second apply member for urging said second apply member axially in one direction relative to one of said third and fourth rotatable transmission housings, means for limiting movement of said second apply member in said one direction, and means for urging axial movement of said second apply piston and said second apply member in an opposite direction to enforce frictional engagement between said first and second torque-transmitting plate members wherein said piston remains non-rotatable within said stationary housing.

6. The rotating torque transmitting apparatus defined in claim 5 further comprising:

said first rotating torque transmitting mechanism being disposed radially outboard of said second rotating type torque transmitting apparatus.

7. A rotating torque transmitting apparatus defined in claim 5 further comprising:

said first rotating torque transmitting mechanism being disposed in substantial axial alignment with said second rotating type torque transmitting mechanism.

* * * * *